United States Patent [19]

Profera, Jr.

[11] Patent Number: 5,355,512
[45] Date of Patent: Oct. 11, 1994

[54] UPLINK NULL INTRUSION REJECTION FOR SATELLITE COMMUNICATIONS SYSTEMS

[75] Inventor: Charles E. Profera, Jr., Cherry Hill, N.J.

[73] Assignee: General Electric Co., East Windsor, N.J.

[21] Appl. No.: 850,422

[22] Filed: Mar. 12, 1992

[51] Int. Cl.$^5$ .................. H04B 7/185; H04B 1/10
[52] U.S. Cl. ................. 455/13.3; 455/295; 455/304; 342/358; 342/361
[58] Field of Search ............. 455/12.1, 13.1, 13.2, 455/13.3, 13.4, 276.1, 278.1, 303, 304, 295, 296; 342/356, 358, 359, 361, 378, 379, 380–384; 333/109, 110, 113–117, 126, 129, 17.1, 18, 142, 143, 145, 137, 12, 21 R, 21 A

[56] References Cited

U.S. PATENT DOCUMENTS

| | | | |
|---|---|---|---|
| 3,963,990 | 6/1976 | DiFonzo | 333/21 A |
| 4,223,283 | 9/1980 | Chan | 333/109 |
| 4,335,388 | 7/1980 | Scott et al. | 342/379 |
| 5,025,485 | 6/1991 | Csongor et al. | 455/13.1 |
| 5,140,694 | 8/1992 | Benden | 455/12.1 |
| 5,222,246 | 6/1993 | Wolkstein | 455/12.1 |

FOREIGN PATENT DOCUMENTS 0414534 2/1991 European Pat. Off. .

OTHER PUBLICATIONS

"High Resolution Adaptive Nulling Performance for a Lightweight Agile EHF Multiple Beam Antenna", By Fenn et al., published at pp. 678–682 of IEEE-Sponsored MILCOM 91 Conference Record, vol. 2, held at McLean, Va., Nov. 4–7, 1991, published by IEEE, New York, 1991.

*Primary Examiner*—Reinhard J. Eisenzopf
*Assistant Examiner*—Lisa Charouel
*Attorney, Agent, or Firm*—W. H. Meise; C. A. Berard; S. A. Young

[57] ABSTRACT

A satellite communications system includes a feed array and reflector receiving antenna coupled to a dual-mode network, for generating two channels, with independent signals representing two beams, one for each channel. Each output channel of the dual-mode network contains redundant information relating to a plurality of information channels. In the absence of an interfering signal or intrusion, the combined signals are amplified and block frequency-converted, then de-multiplexed into separate channels, which are each applied through selection switches to a transmitter multiplexer for retransmission. An alternate signal is tapped from each of the two received signal channels, phase controlled, and combined, to produce a combined signal representing a receive antenna beam with a null controllable in position in response to phase. The combined signal is demultiplexed into separate information channels. In the presence of an intrusion in one of the channels, the selection switch for that channel is set to an alternate position, in which the alternate signal is selected for transmission. Since the alternate signal includes a null in the receive beam, the position of the null may be set to the location of the intrusion signal to suppress the signal.

5 Claims, 4 Drawing Sheets

UPLINK NULL INTRUSION REJECTION FOR SATELLITE COMMUNICATIONS SYSTEMS

BACKGROUND OF THE INVENTION

This invention relates to satellite communications systems generally, and more particularly to satellite communications systems in which uplink antenna beam nulling is used to reject interference from a particular location within the beam.

European Patent Office Publication No. 414,534 A2, based upon U.S. patent application Ser. No. 397,229 filed Aug. 23, 1989 in the name of Benden, describes an anti-intrusion defeating arrangement for communications satellites. As described therein, commercial communications satellites require inexpensive, lightweight, and low power consumption techniques for combating uplink interference. As described in the publication, each feed horn of the receive antenna receives signals from earth stations in different regions of the coverage area. Each horn can receive up to twelve channels from its own particular region. The output from each of the horns is applied by way of a hybrid power divider to a power combining system, and then to a low noise amplifier (LNA) and converter. The signal divided off at the hybrids is applied to a further variable power combining system and to a second LNA. Thus, there is a "main" and an "ancillary" system, and each channel is available from a main LNA and from an ancillary LNA. An array of single pole, double throw (SPDT) switches selects either the main or ancillary channel output for each channel, and the channels are combined for retransmission to the earth by an output multiplexing arrangement. The assumption is made in the Benden publication that an interfering signal in a particular channel originates from a feed horn other than the feed horn which receives the desired signal which is interfered with. With this assumption, (a) the variable power combiners in the ancillary system are adjusted to combine signals only from the horn receiving the desired signal in the ancillary channel to thereby reject the interfering signal in that particular channel, and (b) an appropriate switch of the array of SPDT switches selects the desired channel from the ancillary system in which the interfering signals is rejected, not from the main system. The above-described Benden system has the disadvantage that the received signal is power divided in hybrid circuits before low noise amplification, and thus reduces the amount of signal available before low noise amplification, which undesirably degrades the gain-to-temperature ratio (G/T) in every channel. If the ancillary-system signal is 7 dB below the main system signal, the through loss in the main channel, which is the degradation of G/T, is almost 1 dB. This degradation of the G/T could be avoided by placing an LNA within each channel, but this increases the complexity and weight of the system, and decreases its overall reliability, especially in view of the fact that the low noise amplifier is ordinarily redundant. Thus, if twelve communications channels are provided, twelve LNAs would be required in each of the main and ancillary systems, together with an additional twelve redundant units in each of the main and ancillary systems.

SUMMARY OF THE INVENTION

A spacecraft communications system includes an antenna arrangement for receiving signals arriving at the spacecraft to thereby generate received signals. A first dual-mode network is coupled to the antenna for separating the received signals into at least first and second mutually independent channels occupying the same frequency band. First and second receivers are coupled to the first and second channels respectively, for at least amplifying the received signals in each of the channels to form first and second processed signals. First and second power dividers are coupled to the first and second receivers, respectively, for dividing each of the first and second processed signals into main and ancillary processed signals, respectively. A single pole, double throw switch arrangement includes a common port coupled to a transmitting antenna arrangement and a second port coupled to the first power divider, and also includes a third port for, in a first state of the switch arrangement, coupling the first main processed signals to the transmitting antenna arrangement for radiating the main processed signals and for, in a second state, coupling signals applied to the third port of the switch arrangement to the transmitting antenna arrangement. A power combiner includes first and second input ports and a combined output port, which combined output port is coupled to the third port of the switch arrangement, for vectorially combining signals applied to the first and second input ports of the power combiner for generating vectorially combined signals, and for applying the vectorially combined signals to the third port of the switch arrangement. A phase shifting arrangement is coupled to at least one of the first and second power dividers for adjusting the relative phase of the first and second ancillary processed signals applied to the power combiner. This has the effect of making the vectorially combined signals represent signals received by an antenna beam which includes a null which is adjustable in position in dependence upon the relative phase. In the presence of intrusion, the switch arrangement for that channel is set to the second state, and the phase shifter is adjusted to place the uplink null on the location from which the intruding signal is generated.

DESCRIPTION OF THE DRAWING

FIG. 3b is a similar illustration with nulling with the phase shifters set for a null near the center of CONUS.

DESCRIPTION OF THE INVENTION

Figure 1A:
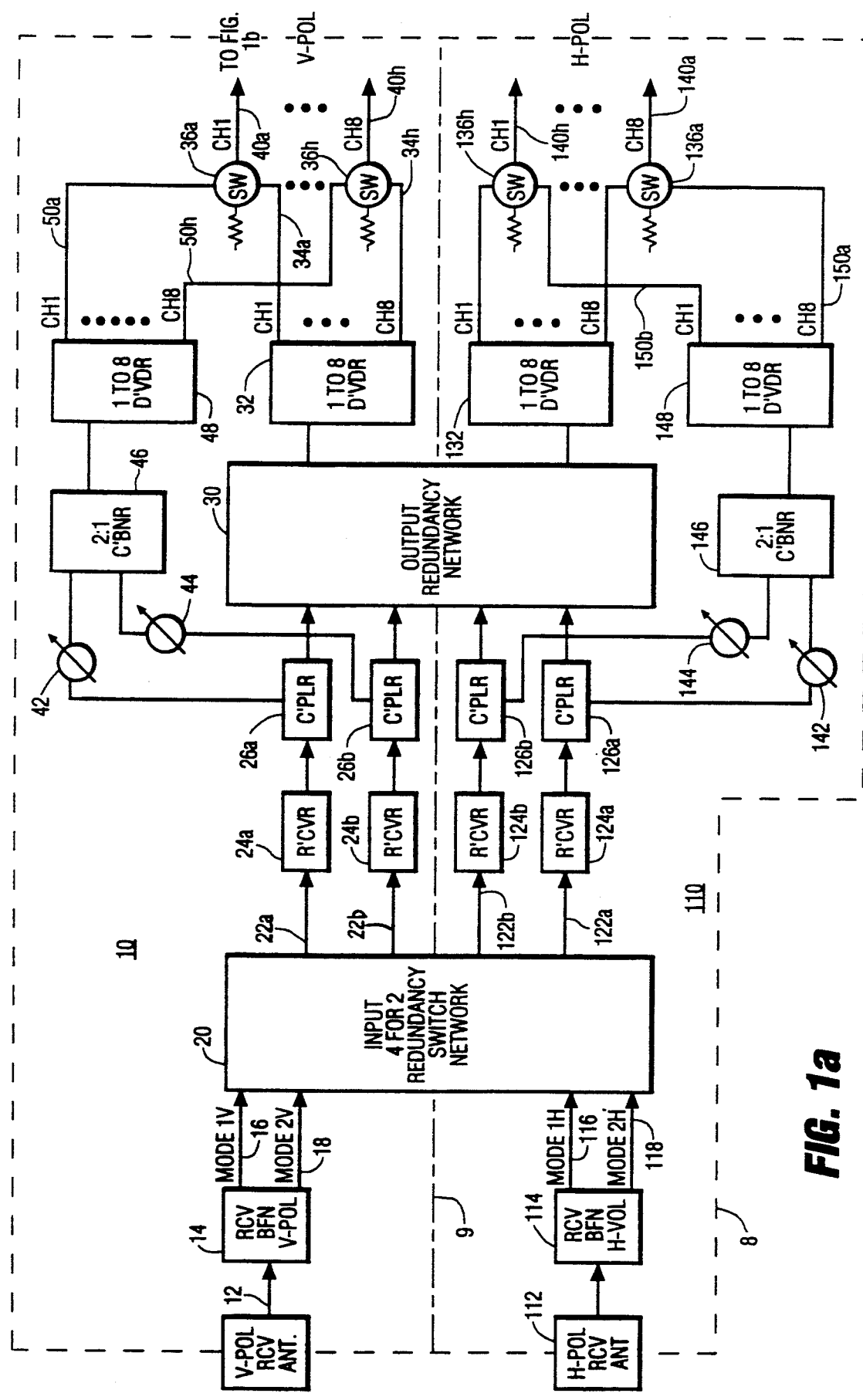
FIGS. 1a and 1b together are a simplified block diagram of a satellite communications system according to the invention.

In FIG. 1a, a satellite 8 includes a bipartite communication system 10, 110. Portion 10 of the communication system is illustrated in FIG. 1a above dividing dot-dash line 9, and includes antenna and system components operating principally on vertically polarized signals. Portion 110 is illustrated below dot-dash line 9, and includes components operating principally on horizontally-polarized signals. Those skilled in the art know that only the antenna signals are so polarized, and the signals referred to as polarized merely originate from (or result in transmitter signals of) the stated polarization. Since the vertical and horizontal portions 10 and 110 are identical except for polarization, only vertically-polarized portion 10 is discussed in detail, the other portion being understood therefrom.

An antenna is a transducer for coupling of signals between antenna terminals and space, by process of either reception or transmission. These processes are reciprocal. Descriptions of antenna operation are ordinarily couched in terms of either transmission or reception, with the other mode of operation being equivalent. In particular, antenna gain and beam width are the same in both transmitting and receiving modes.

In FIG. 1a, vertically-polarized signals originating from an array antenna illustrated as a block 12 are coupled to a dual-mode beamformer 14. Dual-mode beamformers are well known in the satellite antenna art for generating two mutually independent transmitted beams from pairs of multiplexers, as described, for example, in U.S. Pat. No. 4,223,283, issued Sep. 16, 1980 in the name of Chan, and in U.S. patent application Ser. No. 07/834,587 entitled, "Satellite Communications Systems with Zero dB Coupler", filed Feb. 12, 1992 in the name of Kularajah et al. Dual-mode beamformer 14 generates, from the received signals, independent mode 1 and 2 signals on a pair of transmission lines 16 and 18, respectively. These signals are at the same frequency and are mutually coherent. The operation of the dual-mode beamformer in conjunction with an East-West receive antenna array results in mutually opposite East-West phase shifts of the two independent receive beams of modes 1 and 2, i.e. mode 1 may have increasing phase from East to West, in which case mode 2 would have decreasing phase from East to West.

The received signals are applied by way of paths 16 and 18 of FIG. 1a to an input redundancy switch arrangement 20, which controllably couples the received signals in a selected manner by paths 22a and 22b to receivers 24a and 24b, or possibly by paths 22a, 22b, 122a, 122b to receivers 24a, 24b, 124a, 124b. Each of receivers 24 and 124 includes a low-noise amplifier, as described, for example, in copending U.S. patent application Ser. No. 07/772,207 entitled, "Multichannel Communication System with an Amplifier in Each Channel," filed Oct. 7, 1991 in the name of Wolkstein, and a down-converter, for converting the received signal carriers to a different frequency before retransmission to an earth station. Details of redundancy switch arrangement 20 are described below in conjunction with FIG. 2. The signal-to-noise ratio (S/N) or gain-to-temperature ratio (G/T) is established prior to the receiver, and subsequent losses do not significantly affect the ratios.

A power divider or tap, which may be in the form of a hybrid or directional coupler 26a, is coupled to the output of receiver 24a in FIG. 1a, and a like coupler 26b is coupled to the output of receiver 24b. Coupler 26a couples a main portion of the signal received from receiver 24a to an input port of an output redundancy switch arrangement 30, and coupler 26b couples the main portion of the signal received by receiver 26b to another input of switch arrangement 30. The power division ratio in couplers 26a and 26b may be −7 dB, as described above in conjunction with the prior art, but this has little or no effect on the quality of the signals in the main system paths. The −7 dB ancillary signals tapped from the main system path by couplers 26a and 26b are applied to a 2:1 power combiner 46 by way of a pair of phase shifters 42 and 44, respectively.

The main vertical-polarization signal coupled from one of directional couplers 26a or 26b of FIG. 1a is applied by output redundancy switch arrangement 30 to a frequency demultiplexer or frequency divider 32, which separates the signals by frequency into a plurality, such as eight, of separate channels, which are carried on a like plurality of transmission lines 34a through 34h.

The −7 dB ancillary signals tapped from the main system path by couplers 26a and 26b of FIG. 1a are vectorially summed in combiner 46 with relative phases established by the settings of phase shifters 42 and 44. The vectorially combined signal represents a receive antenna beam of receive antenna 12 which has a null which is adjustable in the array direction under the control of phase shifters 42 and 44.

The location of the null depends upon setting of phase shifters 42 and 44, and is the same from channel to channel. Interference or intrusion will generally occur at only one or at most two adjacent channels, and the null can be properly positioned in the East-West direction for that one or those two adjacent channels. The East-West control results from the mutually opposite phase slopes of the independent mode 1 and mode 2 receive beams, as described above.

The vectorially combined signals at the output of combiner 46 of FIG. 1a are applied to a frequency demultiplexer 48, equivalent to demultiplexer 32. The vectorially combined signals are divided by frequency, to put each of the channels on a separate one of transmission paths 50a through 50h.

A plurality of single-pole, double-throw switches 36a through 36h of FIG. 1a each have a common element or port coupled to one of output transmission paths 40a through 40h, each of which is associated with one channel. Each switch selects the signals from either the ancillary system path or from the main system for coupling to its output signal path. As so far described, a single ancillary system is provided. As a result, only one of switches 36a through 36h can be switched to select the ancillary system under ordinary conditions (although if intrusion occurred on several channels and the receive beam null established by phase shifters 42 and 44 happened to be proper for rejecting the intrusion on those several channels, several switches 36 could select the ancillary system). These switches 36 associated with channels free from intrusion are set to select signals from the main system, and that one switch (or more than one, as mentioned above) which is associated with a channel subject to intrusion, is set to select the signal from the ancillary system. Phase shifters 42 and 44 are then adjusted to place the receive beam null on the source of the intrusive signal, with the result that the amplitude of the intrusive signal is reduced relative to the amplitude of the desired channel. If the source of the intrusion is not too close to the source of the desired signal, no adverse effect results. So long as the source of intrusion is not collocated with the source of desired signal, an improvement can be expected.

Figure 1B:
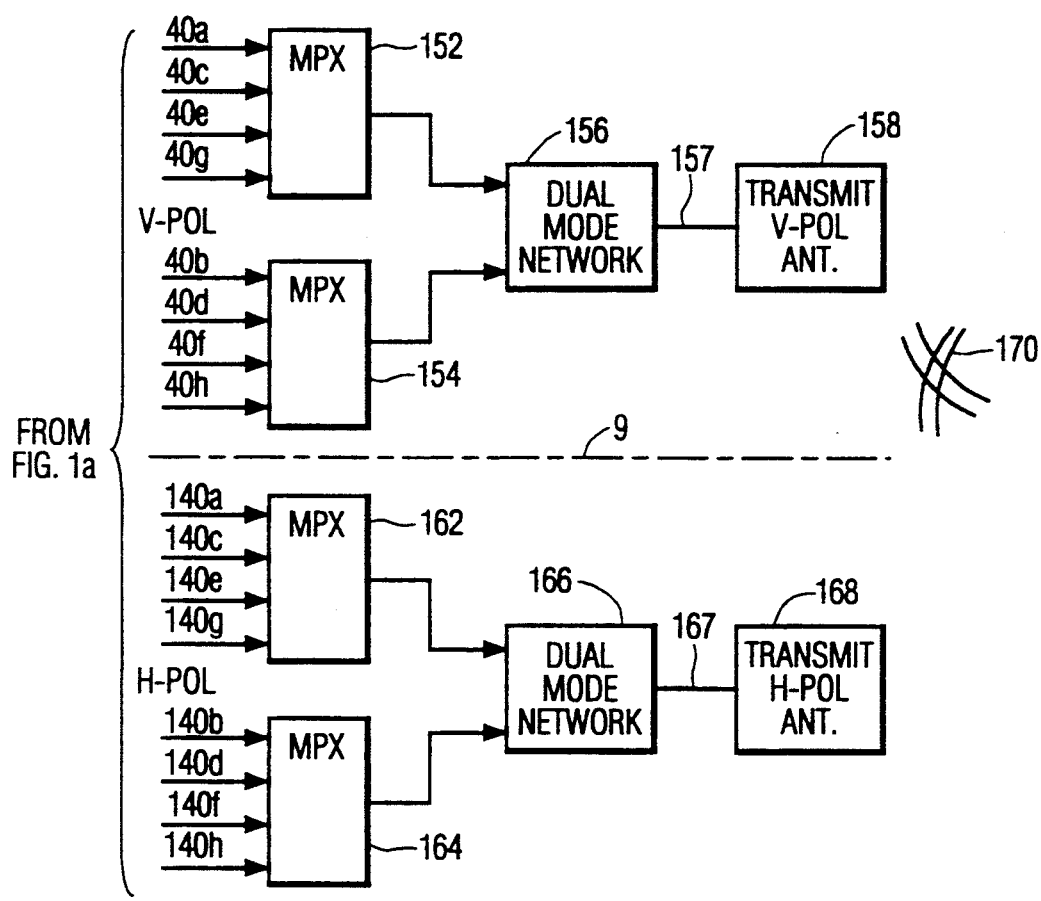

The switched signals at the outputs of switches 36a through 36h of FIG. 1a may, under ordinary conditions, be derived exclusively from the main output of one of directional couplers 26a or 26b. In the presence of an interference on one of channels 1 to 8, with a switch 36 selecting the signal in that channel from demultiplexer 48, the signals at the common ports of switches 36a–36h are coupled onto transmission paths 40a through 40h, respectively. The signals on transmission paths 40a–40h may be combined in many ways. FIG. 1b illustrates a combining and transmitting arrangement. In FIG. 1b, the lowest-frequency channel, on path 40a, is coupled to an input port of a first frequency-dependent combiner 152. The next adjacent channel (which, as mentioned may have an overlap in frequency with the channel on path 40a) is directed over path 40b to another multiplexer 154. The next higher channel is directed over path 40c to multiplexer 152, and the higher-frequency channels are applied, alternating in frequency, to the remaining input ports of multiplexers 152 and 154. The frequency alternation provides "guard bands" which allow multiplexers 152 and 154 to provide improved channel-to-channel isolation. The alternate-channel combined signals at the output of multiplexer 152 are applied to a first input port of a conventional dual-mode network 156, and the alternate-channel-combined signals at the output of multiplexer 154, which channels lie between those of multiplexer 152, are applied to a second input port of dual-mode network 156. Dual-mode network 156 processes the signals and applies the resulting signals over transmission paths illustrated as 157 to a vertically-polarized antenna 158. As mentioned, portions of transmit antenna 158, such as a gridded reflector represented by structure 170, may be common to both the transmitting and receiving antennas.

The horizontally-polarized portion of the communication system, lying below dot-dash line 9 in FIG. 1b, is similar to the vertically-polarized portions, and its operation will be clear from the above description.

"In FIG. 1a, horizontally-polarized signals originating from an array antenna illustrated as a block 112 are coupled to a dual-mode beamformer 114. Dual-mode beamformers are well known in the satellite antenna art for generating two mutually independent transmitted beams from pairs of multiplexers, as described, for example, in U.S. Pat. No. 4,223,283, issued Sep. 16, 1980 in the name of Chan, and in U.S. patent application Ser. No. 07/834,587 entitled, "Satellite Communications Systems with Zero dB Coupler", filed Feb. 12, 1992 in the name of Kularajah et al. Dual-mode beamformer 114 generates, from the received signals, independent mode 1 and 2 signals on a pair of transmission lines 116 and 118, respectively. These signals are at the same frequency and are mutually coherent. The operation of the dual-mode beamformer in conjunction with an East-West receive antenna array results in mutually opposite East-West phase shifts of the two independent receive beams of modes 1 and 2, i.e. mode 1 may have increasing phase from East to West, in which case mode 2 would have decreasing phase from East to West.

The received signals are applied by way of paths 116 and 118 of FIG. 1a to input redundancy switch arrangement 20, which controllably couples the received signals in a selected manner to receivers 124a and 124b, or possibly to receivers 24a, 24b, 124a, 124b. Each of receivers 124a and 124b includes a low-noise amplifier, as described, for example, in copending U.S. patent application Ser. No. 07/772,207 entitled, "Multichannel Communication System with an Amplifier in Each Channel," filed Oct. 7, 1991 in the name of Wolkstein, and a down-converter, for converting the received signal carriers to a different frequency before retransmission to an earth station. Details of redundancy switch arrangement 20 are described below in conjunction with FIG. 2. The signal-to-noise ratio (S/N) or gain-to-temperature ratio (G/T) is established prior to the receiver, and subsequent losses do not significantly affect the ratios.

A power divider or tap, which may be in the form of a hybrid or directional coupler 126a, is coupled to the output of receiver 124a in FIG. 1a, and a like coupler 126b is coupled to the output of receiver 124b. Coupler 126a couples a main portion of the signal received from receiver 124a to an input port of output redundancy switch arrangement 30, and coupler 126b couples the main portion of the signal received by receiver 126b to another input of switch arrangement 30. The power division ratio in couplers 126a and 126b may be −7 dB, as described above in conjunction with the prior art, but this has little or no effect on the quality of the signals in the main system paths. The −7 dB ancillary signals tapped from the main system path by couplers 126a and 126b are applied to a 2:1 power combiner 146 by way of a pair of phase shifters 142 and 144, respectively.

The main vertical-polarization signal coupled from one of directional couplers 126a or 126b of FIG. 1a is applied by output redundancy switch arrangement 30 to a frequency demultiplexer or frequency divider 132, which separates the signals by frequency into a plurality, such as eight, of separate channels, which are carried on a like plurality of transmission lines.

The −7 dB ancillary signals tapped from the main system path by couplers 126a and 126b of FIG. 1a are vectorially summed in combiner 146 with relative phases established by the settings of phase shifters 142 and 144. The vectorially combined signal represents a receive antenna beam of receive antenna 112 which has a null which is adjustable in the array direction under the control of phase shifters 142 and 144.

The location of the null depends upon setting of phase shifters 142 and 144, and is the same from channel to channel. Interference or intrusion will generally occur at only one or at most two adjacent channels, and the null can be properly positioned in the East-West direction for that one or those two adjacent channels. The East-West control results from the mutually opposite phase slopes of the independent mode 1 and mode 2 receive beams, as described above.

The vectorially combined signals at the output of combiner 146 of FIG. 1a are applied to a frequency demultiplexer 148, equivalent to demultiplexer 132. The vectorially combined signals are divided by frequency, to put each of the channels on a separate one of transmission paths 150a through 150h.

A plurality of single-pole, double-throw switches 136a through 136h of FIG. 1a each have a common element or port coupled to one of output transmission paths 140a through 140h, each of which is associated with one channel. Each switch selects the signals from either the ancillary system path or from the main system for coupling to its output signal path. As so far described, a single ancillary system is provided for horizontal system 110. As a result, only one of switches 136a through 136h can be switched to select the ancillary system under ordinary conditions (although if intrusion occurred on several channels and the receive beam null established by phase shifters 142 and 144 happened to be proper for rejecting the intrusion on those several channels, several switches 136 could select the ancillary system). These switches 136 associated with channels free from intrusion are set to select signals from the main system, and that one switch (or more than one, as mentioned above) which is associated with a channel subject to intrusion, is set to select the signal from the ancillary system. Phase shifters 142 and 144 are then adjusted to place the receive beam null on the source of the intrusive signal, with the result that the amplitude of the intrusive signal is reduced relative to the amplitude of the desired channel. If the source of the intrusion is not too close to the source of the desired signal, no adverse effect results. So long as the source of intrusion is not collocated with the source of desired signal, an improvement can be expected.

The switched signals at the outputs of switches 136a through 136h of FIG. 1a may, under ordinary conditions, be derived exclusively from the main output of one of directional couplers 126a or 126b. In the presence of an interference on one of channels 1 to 8, with a switch 136 selecting the signal in that channel from demultiplexer 148, the signals at the common ports of switches 136a–136h are coupled onto transmission paths 140a through 140h, respectively. The signals on transmission paths 140a–140h may be combined in many ways."

The advantages of the described system are achieved, in part, by taking advantage of that one of receivers 24a and 24b of FIG. 1a which is not currently in use for the main system (i.e. the redundant receiver) for improving the G/T of the ancillary channel. So long as both amplifiers remain operational, the advantages of the described system for reducing intrusion are achieved. In the event that one of the amplifiers fails, so that only one amplifier is available for the vertical channel, the ability to suppress intrusion is compromised. If the failure of one of the receivers is not complete, it may still be usable in the ancillary channel, even through degraded, as being better than the intrusion.

Figure 2:
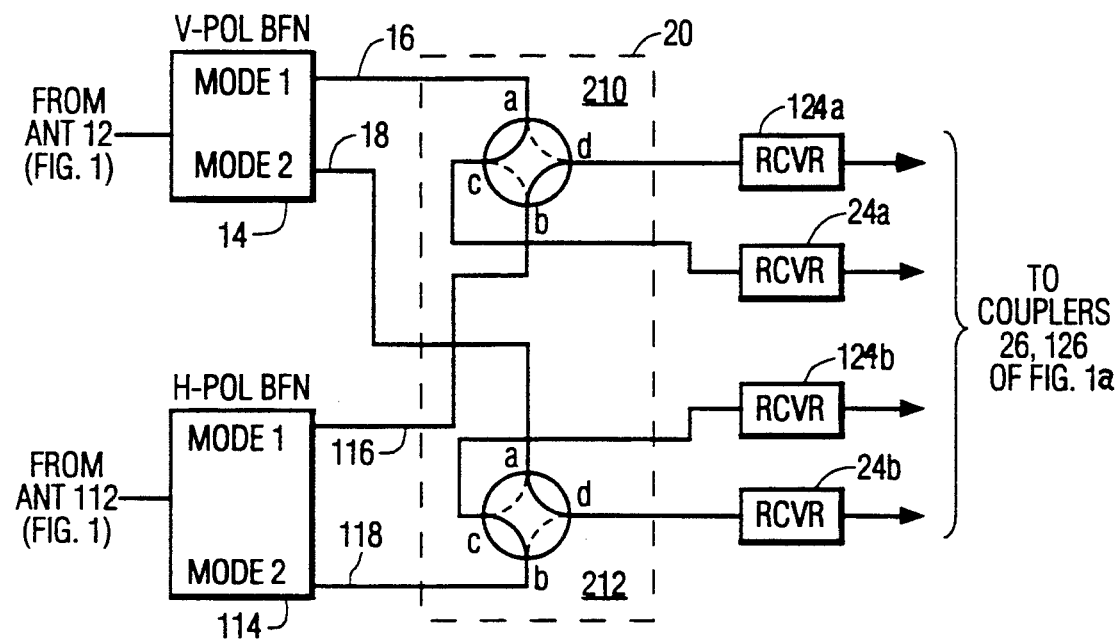
FIG. 2 illustrates a redundancy switch network for orthogonal beam antennas.

FIG. 2 is a simplified block diagram illustrating a "4-for-2" switch arrangement which may be used in input redundancy switch network 20 of FIG. 1a. In FIG. 2, elements corresponding to those of FIG. 1a are designated by like reference numerals. In FIG. 2, first and second double-pole, double-throw switches 210 and 212, respectively, each include first and second input ports a and b, and first and second output ports c and d. Input ports a and b of switch 210 are coupled to the mode 1 outputs of vertical and horizontal BFN 14 and 114, respectively. Output ports c and d of switch 210 are coupled to receivers 24a and 124a, respectively. Input ports a and b of switch 212 are coupled to the mode 2 outputs of vertical and horizontal BFN 14 and 114, respectively, and output ports c and d of switch 212 are coupled to receivers 124b and 24b, respectively.

The illustrated positions of switches 210 and 212 of redundancy switch network 20 of FIG. 2 are those in which the connections correspond to those suggested in FIG. 1a. In particular, the vertically-polarized mode 1 signal on path 16 is coupled to receiver 24a, and the vertically-polarized mode 2 signals are coupled to receiver 24b. Similarly, the horizontally-polarized mode 1 and mode 2 signals are applied to receivers 122a and 122b, respectively. The illustrated arrangement allows three modes to be processed in the event that one receiver fails. For example, if receiver 24a fails, the vertically polarized mode 1 signal cannot be processed. If there is no interference in the vertically-polarized signals, output redundancy network 30 is set to couple the output of receiver 24b to 1-to-8 demultiplexer 32, if it is not already in that condition, and operation continues as before, except that the ability is lost to form a null in the vertically polarized receive antenna pattern. So long as nulls are required only in the horizontally polarized receive antenna pattern, switches 210 and 212 of FIG. 2 may remain in the illustrated state. Still assuming that receiver 24a has failed, it is possible to operate switches 210 and 212 so that a null can be formed in the vertically polarized signal channels. This is accomplished by operating switches 210 and 212 to their alternate positions (not illustrated), which couples the vertically-polarized mode 1 and 2 signals from paths 16 and 18 to receivers 122a and 122b, respectively, while at the same time coupling the horizontally-polarized mode 2 signal from path 118 to operable receiver 24b. This allows phase shifters 142 and 144, 2:1 combiner 146, and 1-to-8 divider 148 to form an effective null in the vertically-polarized receive beam, while allowing continued reception, without a null, of the horizontally polarized mode 2 signal. The polarization of the down-link becomes reversed by this process, but this is not believed to be of any consequence. Thus, operation of the redundancy switches allows the desirable up-link null to be produced when desired for interference suppression, so long as two receivers are available which can be switched to process the two signals of one polarization of the up-link. If two receivers fail, the switching may be arranged to process signals in both up-link polarizations without forming nulls, or one up-link polarization can be abandoned, if necessary, to allow nulling of the up-link for high-priority signals.

Figure 3A:
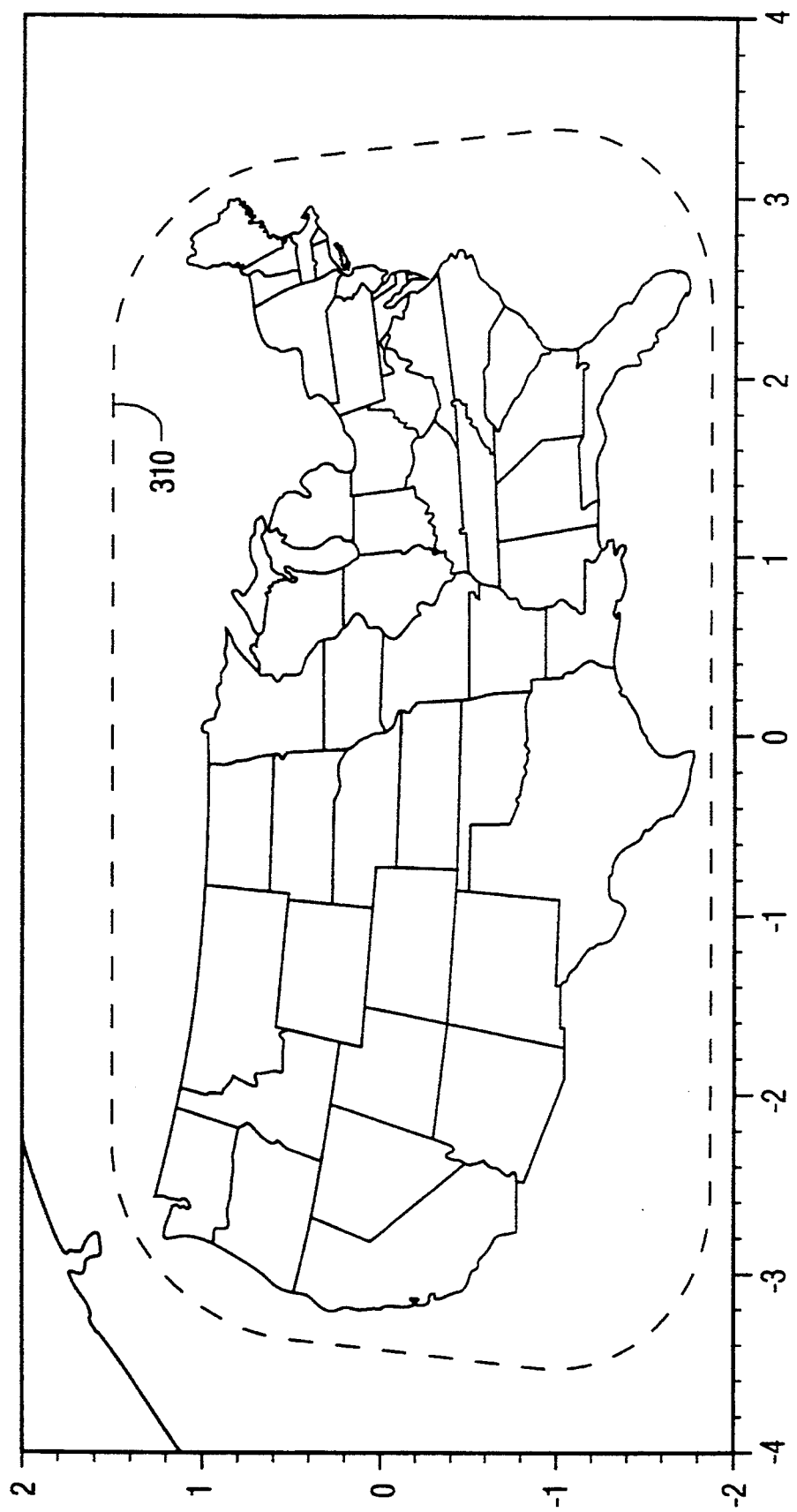
FIGS. 3a and 3b is an illustration of the continental United States (CONUS), illustrating the basic receive antenna coverage.
Figure 3B:
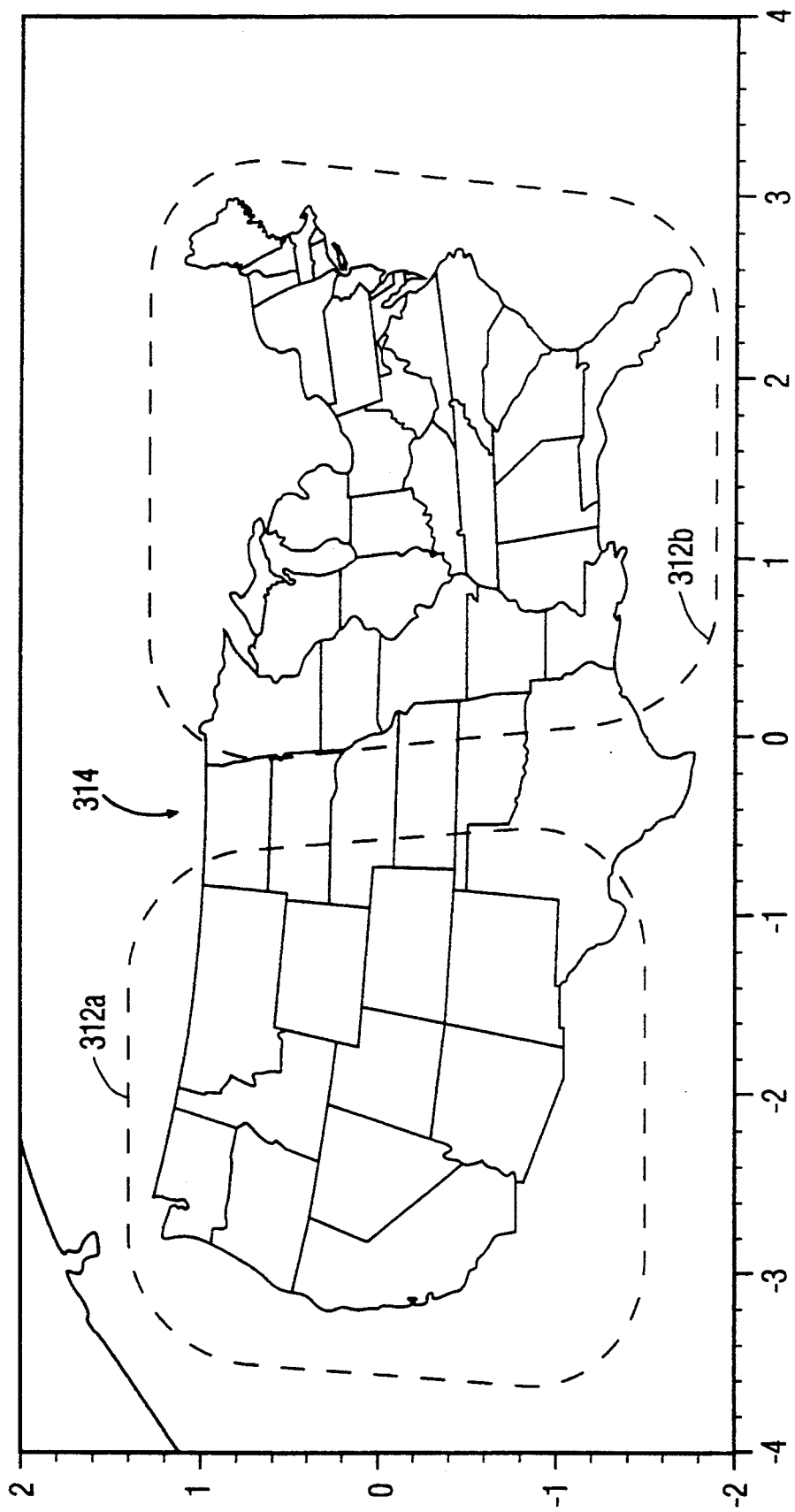

FIG. 3a is a map of CONUS as seen from a geosynchronous satellite located at 90° West longitude. A conceptual receiving beam of acceptable up-link gain in the absence of a null and G/T is represented by dash line 310. When a source of interference originating near the center of Texas interferes with a vertically-polarized signal on channel eight, arriving from New York, switches 210 and 212 are set to the condition illustrated in FIG. 2, switches 36a through 36g of FIG. 1a are left in their principal positions, coupling signal from 1-to-8 divider 32 to output transmission paths 40a through 40g, and switch 36h of FIG. 1a, which handles channel 8, is thrown to its alternate position, in which it decouples output transmission path 40h from 1-to-8 divider 32, and instead couples path 40h to receive channel 8 from 1-to-8 divider 48. Thus, channel 8 on the down-link is provided an effective null in the up-link or vertically-polarized receive beam, and the position of the channel 8 null is controlled by the relative phases of phase shifters 42 and 44 of FIG. 1a. For the described example, a null is needed near the center of Texas in channel 8, and the channel-8 effective vertical up-link receive beam can be adjusted in an East-West direction in response to phase shifters 42 and 44 to that represented by dash-line 312a and 312b of FIG. 3b, with a null region 314 therebetween. Since there is no desired signal originating from the null region on channel 8, the interfering signal is attenuated by the null without adverse effect on the desired signal originating from New York. The effective up-link beam shape of vertically-polarized channel 1 through 7 signals continues to be that of 310 of FIG. 3a, so desired signal source on another vertically-polarized channel, for example channel 3, originating from the center of the CONUS, would be unaffected by the null on channel 8.

Other embodiments of the invention will be apparent to those skilled in the art. While the description refers to orthogonal vertical and horizontal polarizations, any two orthogonal polarizations may be used, either linear or circular. While two phase shifters 42, 44 have been described in conjunction with the vertical portion 10 of the system of FIG. 1, a single phase shifter will suffice to provide a relative phase shift between the inputs of power coupler 46. The null has been described as being movable in an East-West direction, corresponding to the direction of the slope of the mode 1 and mode 2 beams generated by the dual-mode system in conjunction with an East-West oriented feed array. The null could instead be movable North-South, if the feed array direction were such.

What is claimed is:

1. A spacecraft communications system which can reduce intrusion originating from a particular location on the globe, comprising:

first array antenna means for receiving signals arriving at the spacecraft to generate received signals;

a first dual-mode network coupled to said first array antenna means for separating said received signals into at least first and second mutually independent channels;

first and second receiving means for at least amplifying signals applied thereto;

first receiver coupling means coupled to said first and second receiving means and to said first dual-mode network, for coupling said received signals in said first and second channels to said first and second receiving means, respectively, whereby said first and second receiving means at least amplify said received signals to form first and second processed signals, respectively;

first and second power dividing means coupled to said first and second receiving means, respectively, for dividing each of said first and second processed signals into first and second main processed signals and first and second ancillary processed signals;

transmitting antenna means adapted for radiating signals to a distant location;

single-pole, double throw switch means including a common port, and first and second ports which may be alternately coupled to said common port in first and second states of said switch means to form switched signals at said common port;

main signal coupling means coupled to said first and second power dividing means and to said first port of said switch means for coupling said main processed signals to said switch means for being selectively coupled to said common port of said switch means in said first state of said switch means, whereby said switched signals comprise at least a portion of said first and second main processed signals in said first state of said switch means;

switched signal coupling means coupled to said common port of said switch means and to said transmitting antenna means for coupling said switched signal to said transmitting antenna means, whereby in said first state of said switch means, at least said portion of said first and second main processed signal is coupled to said transmitting antenna means and radiated to said distant location;

power combining means including first and second input ports and a combined output port, for vectorially combining signals applied to said first and second input ports of said power combining means for generating vectorially combined signals at said combined output port;

combined signal coupling means coupled to said combined output port of said power combining means and to said second port of said switch means for applying said vectorially combined signals to said second port of said switch means; and phase shifting and coupling means coupled to said first and second ports of said power combining means and to said first and second power dividing means, for applying said first and second ancillary processed signals to said power combining means, and for adjusting the relative phase of said first and second ancillary processed signals applied to said power combining means, whereby said vectorially combined signals represent signals received by a beam of said first array antenna means, which beam includes a null adjustable in position in dependence upon said relative phase, and whereby said switch means may be set to said second state during an intrusion, and said phase shifting means may be set to said particular location to reduce the severity of said intrusion.

2. A system according to claim 1, wherein said transmitting antenna means comprises at least a portion of said first array antenna means.

3. A system according to claim 1, wherein said main signal coupling means comprises:

first demultiplexing means including a plurality of H output ports, and also including a common port coupled to at least one of said first and second power dividing means, for receiving one of said main processed signals, and for distributing said one of said main processed signals among said H output ports of said first demultiplexing means in accordance with frequency components of said one of said main processed signals, whereby each separate frequency component of said one of said main processed signals is coupled to a different one of said H output ports of said first demultiplexing means; and main processed signal frequency component coupling means coupled to one of said output ports of said first demultiplexing means and to said first port of said switch means.

4. A system according to claim 1, wherein:

said main signal coupling means includes first frequency demultiplexing means, said first frequency demultiplexing means including a plurality of H output ports, and also including a common port coupled to at least one of said first and second power dividing means, for receiving one of said main processed signals, and for distributing said one of said main processed signals among said H output ports of said first demultiplexing means in accordance with frequency components of said main processed signals, whereby each of H separate frequency components of said one of said main processed signals is coupled to a different one of said H output ports of said first demultiplexing means;

said combined signal coupling means includes second frequency demultiplexing means including a second plurality of H output ports, and also including a common port coupled to said power combining means, for receiving said vectorially combined signal, and for dividing said vectorially combined signal among said H output ports of said second frequency demultiplexing means in accordance with frequency components of said vectorially combined signal, which frequency components occupy the same separate frequency components as those of said first frequency demultiplexing means, whereby each separate frequency component of said vectorially combined signal is coupled to a different one of said H output ports of said second demultiplexing means;

said switch means includes a plurality of H switch elements, each including a common port, and first and second switchable ports which may be alternately coupled to said common port of said switch means, each of said first ports of said H switch elements of said switch means being coupled to one of said H output ports of said first frequency demultiplexing means, whereby, in said first state of said switch means, at least one of said H separate frequency components of said one of said main processed signals is coupled by way of said first and common ports of one of said H switch elements to said transmitting antenna means, each of said second ports of H switch elements of said switch means being coupled to one of said H output ports of said second frequency demultiplexing means, whereby, in said second state of said switch means, at least one of said H separate frequency components of said vectorially combined signal is coupled by way of said second and common ports of one of said H switch elements to said transmitting antenna means.

5. A system according to claim 1, wherein:

said first array antenna means includes polarization selection means for, during reception, responding to a first polarization in preference to a second polarization orthogonal to said first polarization; and further comprising:

second array antenna means for receiving signals arriving at said spacecraft with said second polarization for generating second received signals;

a second dual-mode network coupled to said second array antenna means for separating said second received signals into at least third and fourth mutually independent channels;

third and fourth receiving means for at least amplifying signals applied thereto;

second receiver coupling means coupled to said third and fourth receiving means and to said second dual-mode network, for coupling said second received signals in said third and fourth channels to said third and fourth receiving means, respectively, whereby said third and fourth receiving means at least amplify said second received signals to form third and fourth processed signals, respectively; and wherein said first and second receiver coupling means together comprise:

first redundancy switch means including a first port coupled to said first channel of said first dual-mode network, a second port coupled to said third channel of said second dual-mode network, a third port coupled to said first receiving means, and a fourth port coupled to said third receiving means, for, in a first state of said first redundancy switch means, coupling said first received signals from said first channel of said first dual-mode network to said first receiving means and said second received signals from said third channel of said second dual-mode network to said third receiving means, and for, in a second state of said first redundancy switch means, coupling said first received signals from said first channel of said first dual-mode network to said third receiving means and said second received signals from said third channel of said second dual-mode network to said first receiving means; and second redundancy switch means including a first port coupled to said second channel of said first dual-mode network, a second port coupled to said fourth channel of said second dual-mode network, a third port coupled to said fourth receiving means, and a fourth port coupled to said second receiving means, for, in a first state of said second redundancy switch means, coupling said first received signals from said second channel of said first dual-mode network to said second receiving means and said second received signals from said fourth channel of said second dual-mode network to said fourth receiving means, and for, in a second state of said second redundancy switch means, coupling said first received signals from said second channel of said first dual-mode network to said fourth receiving means and said second received signals from said fourth channel of said second dual-mode network to said second receiving means.

* * * * *